(12) United States Patent
Virtanen

(10) Patent No.: US 7,575,630 B2
(45) Date of Patent: Aug. 18, 2009

(54) BINDER ADMIXTURE, KAOLIN PRODUCT AND THEIR MANUFACTURE

(75) Inventor: Pentti Virtanen, Toijala (FI)

(73) Assignee: Kautar Oy, Toijala (FI)

( * ) Notice: Subject to any disclaimer, the term of this patent is extended or adjusted under 35 U.S.C. 154(b) by 583 days.

(21) Appl. No.: 10/493,982

(22) PCT Filed: Nov. 1, 2002

(86) PCT No.: PCT/FI02/00853

§ 371 (c)(1),
(2), (4) Date: Sep. 7, 2004

(87) PCT Pub. No.: WO03/037523

PCT Pub. Date: May 8, 2003

(65) Prior Publication Data

US 2005/0000393 A1  Jan. 6, 2005

(51) Int. Cl.
C04B 14/10 (2006.01)
(52) U.S. Cl. .................. 106/718; 106/486; 106/694
(58) Field of Classification Search .................. 106/718, 106/486, 694
See application file for complete search history.

(56) References Cited

U.S. PATENT DOCUMENTS

| | | | |
|---|---|---|---|
| 3,224,892 A | 12/1965 | Hemstock | |
| 4,095,995 A | 6/1978 | Ullrich | 106/308 |
| 4,640,715 A * | 2/1987 | Heitzmann et al. | |
| 4,642,137 A * | 2/1987 | Heitzmann et al. | |
| 5,122,191 A * | 6/1992 | Morozumi et al. | 106/811 |
| 5,393,340 A * | 2/1995 | Slepetys et al. | 106/484 |
| 5,626,665 A | 5/1997 | Barger et al. | 106/706 |
| 5,788,762 A | 8/1998 | Barger et al. | 106/706 |
| 5,882,395 A | 3/1999 | Linde et al. | 106/460 |
| 5,948,157 A | 9/1999 | McKenney et al. | 106/771 |
| 5,958,131 A * | 9/1999 | Asbridge et al. | 106/718 |
| 5,976,241 A | 11/1999 | Kim et al. | 106/718 |

(Continued)

FOREIGN PATENT DOCUMENTS

WO    WO 01/02317 A1    1/2001

OTHER PUBLICATIONS

Answer 35 of 41 of CA on STN FR 2661903 (Ambroise et al.) abstract only Nov. 15, 1991.*

(Continued)

*Primary Examiner*—Paul Marcantoni
(74) *Attorney, Agent, or Firm*—McCormick, Paulding & Huber LLP

(57) ABSTRACT

A binder mix containing a hydraulic binding agent and an admixture mixed therewith, a process for preparing a hydraulically hardened binder mass, a calcinated kaolin product and a process for preparing the same. A paste-like composition is formed from the hydraulically hardening binding agent, a pozzolanically reacting admixture and water, which, when so desired, contains stone aggregate or similar filler, the paste-like composition is worked and the worked composition is allowed to harden to form the binder mass. The admixture comprises spherical, porous metakaolin agglomerates, the size of which is 2-200 microns and which have an open pore structure. The invention can be used to improve the manufacturing methods of cast concrete products and shorten the manufacturing times, and to provide concrete with better mechanical and chemical properties, as well as improve the fire and frost resistance of concrete.

18 Claims, 10 Drawing Sheets

U.S. PATENT DOCUMENTS

| | | | | |
|---|---|---|---|---|
| 6,027,561 | A * | 2/2000 | Gruber et al. | 106/718 |
| 6,221,148 | B1 * | 4/2001 | Mathur et al. | 106/484 |
| 6,596,072 | B1 * | 7/2003 | Dunnous et al. | 106/456 |
| 6,695,990 | B1 * | 2/2004 | Dunnous et al. | 264/12 |
| 2001/0047741 | A1 | 12/2001 | Gleeson et al. | 106/709 |

OTHER PUBLICATIONS

Answer 30 of 41 of CA on STN FR 2795359 (Morin Systeme) abstract only Dec. 29, 2000.*

"Session III-I Structures and Physcial Properties of Cement Paste, Principal Paper Structures and Physical Properties of Cement" by George J. Verbeck, et al., pp. 1 and 7-12.

Excerpt from "Properties of Concrete", "Strength of Concrete", pp. 276-285.

* cited by examiner

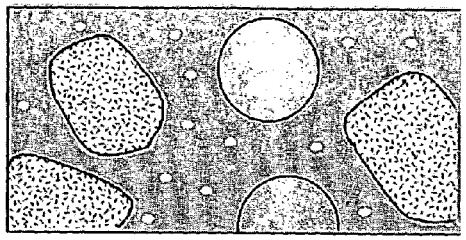

PHASE 1 CASTING
Casting the concrete. The cement paste has cement particles, gas-filled agglomerates and air bubbles in an aqueous phase.

FIG 2A

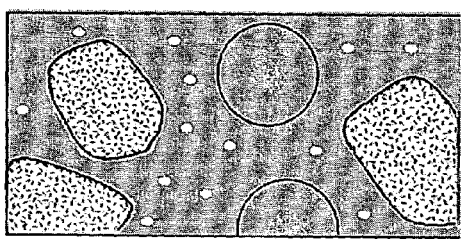

PHASE 2 SETTLING
Settling of concrete in shuttering. Extra water is stored in the pores of the agglomerate.

FIG 2B

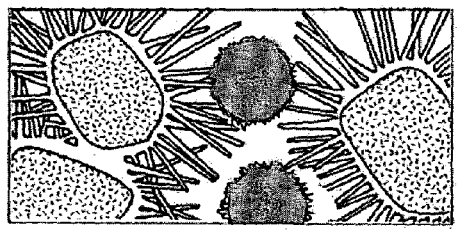

PHASE 3 HYDRATION
The hydration of cement increases the temperature and induces underpressure, whereby some of the water returns from the agglomerate to the hardening cement gel.

FIG 2C

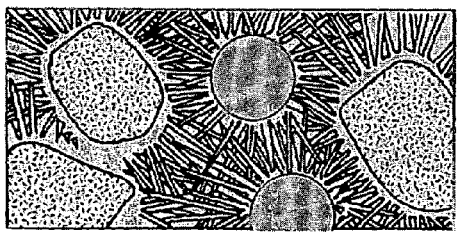

PHASE 4 DRYING
At the drying phase, water exits the concrete. The agglomerate delivers water, but its hard peel prevents shrinkage.

At the moment of stripping the shuttering, the degree of hydration is, for example, $\alpha = 0.4$, and the hydration continues for several years.

FIG 2D

BONDING BETWEEN HYDRATED CEMENT AND STONE AGGREGATE
(According to Zimbelman)

The relative sizes of particules and pores in hydrated cement paste

BINDER ADMIXTURE, KAOLIN PRODUCT AND THEIR MANUFACTURE

Applicant hereby claims foreign priority benefits under 35 U.S.C. § 119 of PCT Patent Application No. PCT/FI02/00853 filed Nov. 1, 2002; Finland Patent Application No. 20012116 filed Nov. 1, 2001 and Finland Patent Application No. 20021445 filed Aug. 5, 2002, the disclosures of which are herein incorporated by reference.

BACKGROUND OF THE INVENTION

1. Technical Field

The present invention relates to new kaolin products and their preparation and use.

The invention relates to a binder mix in particular, which typically contains a hydraulically hardening binder and a pozzolanically reacting admixture.

The invention further relates to a process for manufacturing calcinated kaolin and a process for manufacturing a hardened binder mass.

2. Background Information

Metakaolin can be used as an additive of cement. Accordingly, the U.S. Pat. No. 6,027,561 describes a composition that contains cement and a highly active pozzolan that contains metakaolin. This is manufactured by means of treating kaolin thermally, elutriating it in water and drying the slurry by spray drying, whereby small agglomerated beads with a diameter of at least 10 microns are formed. They are formed from particles, the size of which (d50) is 5 microns or less. A known dispersing agent can be added into the metakaolin. As fine-grained pozzolan generally requires a greater amount of water, the purpose of the known solution is to provide a product, which has no negative effects on the fluidity or the water demand of concrete. The beads consist of metakaolin microparticles (70-100%) and dispersing agents and other additives (0-30%). In this way, the fluidity of cement can be improved compared to a case where fine-grained pozzolan is used.

Other patents, which use metakaolin as additives of cement include U.S. Pat. Nos. 5,976,241, 5,958,131, 5,626,665, 5,122,191 and 5,788,762, the latter including a versatile overview of the use of metakaolin and its advantages as an additive of cement. A common feature for all the solutions is the use of metakaolin as such, whereby its pozzolanic properties are utilized.

Microspheres consisting of various materials have been used as additives of cement. An example of such an application is the solution disclosed in US patent application 20010047741, wherein a porous substance can be, for example, volcanic ash or hollow ceramic microspheres or combinations thereof. The purpose behind the use of these microspheres is to obtain the advantage of an essentially lighter-weight substance combination. The density of the porous additive is 0.5-1.2 g/cm$^3$, preferably 0.9-1.1 g/cm$^3$. The size of the porous particles is 20-120 microns (micrometres).

In some cases, the spheres that are used to lighten concrete have closed surfaces, and efforts have been made to actually minimize the amount of water absorbed by them. On the other hand, large light expanded clay aggregates, which have also been used to lighten concrete and to also bring water to the concrete matrix, are so large that their relatively low strength constitutes the weakest ling in the concrete matrix.

Patent literature has also dealt with the adjustment of the amount of water during the hardening reaction of cement. Accordingly, the U.S. Pat. No. 5,948,157 discloses an admixture, the surface of which is treated so that it has a transient hydrophobic property, whereby it will not deliver water, when the admixture is added into the mix, but will later on change so that the travel of water during the hardening reaction of the mixture is possible. The additive can either react with the mixture during hardening or by means of intermediary reaction products or by physically binding itself to the mix. The additive can be any substance, the surface properties of which can be changed transiently. In a preferred application, the additive is silicate, which by nature is slightly hydrophilic. The silicate can be formed from a reactive material. It is preferably formed from a pozzolanic and hydraulic material or the mixtures thereof. The treating agent can be an organic oxide that has at least three carbon atoms. In can also be a surface-active agent that includes a hydrophobic component, which has an organic oxide with 3 carbon atoms. The treating agent covers at least part of the surface of the additive and gives it a transient hydrophobic property, but does not react with it. The purpose is that the effect of the treating agent is valid only for the time of treating the mixture and, after this, its effect starts to decrease, whereby the additive can participate in reactions with the mixture.

U.S. Pat. No. 4,095,995 deals with the manufacture of light concrete. In order to avoid the entry of water into the porous aggregate, when manufacturing light concrete, an additive is brought onto the surfaces of the aggregates, forming, together with the cement slurry, a gel-like protective layer, which only has a limited permeability to water. When coating the aggregates, a dry additive is used, which contributes to the creation of a bonding between the cement and the aggregates. The said additive is a polyethylene oxide with a high molecular weight.

Adding water by means of the particles in the concrete matrix during the hardening reaction of concrete, which can be used to decrease autogenous contraction, is dealt with in the application publication WO 0102317, wherein the said particles are of organic polymer, 'hydrogel'.

The manufacture and use of round inorganic granules for dyeing concrete is considered, among others, in the U.S. Pat. No. 5,882,395.

Although the number of patents related to the admixtures of concrete and the control of hardening is fairly extensive, as a whole, the solutions mentioned above generally only deal with some single phenomena related to the properties of concrete, and they have neither been capable of considerably improving the manufacturing processes of cast concrete products, nor shortening the manufacturing times, nor providing concrete with better mechanical and chemical properties.

SUMMARY OF THE INVENTION

The purpose of the present invention is to eliminate the disadvantages related to known technology and to provide a new solution for improving the mechanical and chemical properties of mixes containing cement and corresponding hydraulic binders. Another purpose of the invention is to also improve the properties of hardened binder masses (such as concrete) containing a filling agent (such as stone aggregate), their mechanical properties and the fire and frost resistance in particular.

Generally, the purpose of the invention is to provide a new kind of a kaolin particle product, which is based on metakaolin consisting of agglomerates of metakaolin.

The invention is based on the idea that metakaolin agglomerate is formed first, and then calcinated to various degrees of calcination, whereby the density of the surface part after calcination is lower than that of the inner part. Calcinated agglomerate is 2-100 micrometres in size, preferably about 5-40 micrometres. The calcination can be brought to the degree of metakaolin, whereby the amount of crystal water of the product's outer surface is typically about 0-8% by weight and that of the inner part 2-14% by weight. The calcination can also be continued so that calcinated kaolin having an exothermic crystal structure is provided. In the structure, the pore structure can open all the way to the surface. The agglomerates according to the invention have a good mechanical strength. Typically, the agglomerate of calcinated kaolin also has good optical properties.

Products according to the invention can be manufactured, among others, by means of a process, wherein slurry with a high dry content (over 50% of the weight of the slurry, preferably about 60-80%, typically about 70%) is used, when forming the agglomerate. For making a calcinated product, the agglomerate is preferably calcinated at a fluid state by mainly using heat that is transformed as radiation. The agglomerates are preferably classified using an ionic wind method that does not induce a great deal of mechanical stress.

The process according to the invention for producing agglomerates combines the spray gas phase method and radiation drying. Metakaolin, which is provided by fluid radiation, is post-calcinated into a crystal form, for example, by means of radiation heat transfer.

According to the invention, an admixture of concrete is provided, for example. Consequently, according to the invention, an admixture comprising at least spherical, porous agglomerate that reacts pozzolanically on its surface is added into a binder admixture containing a hydraulically hardening binder. The admixture can be used to replace a part, e.g., about 5-35% by weight, preferably about 10-25% by weight of the binding agent. Water is stored reversibly in the pore structure of such spherical, porous agglomerates after processing the binder mass (the cement mass), whereby the water stored in the pore structure is returned in the subsequent hardening phases of the cement and admixture paste.

The binder admixture used in the invention is characterized in having been provided, at the processing stage, with a capability to absorb, in real time, and store such a water surplus, which in the treating phase of concrete advances mixing, casting and dampproofing. This water surplus, which is evenly stored throughout the matrix, can be utilized later on, when it is needed to decrease autogenous shrinkage and the resulting micro cracking.

Porous, mechanically strong mineral agglomerates work as the storage for water. The material of these agglomerates is preferably selected from a group of substances, which, when calcinated, provides a pozzolanic property at least on the surface of the agglomerate. Typically, such a mineral substance belongs to clay minerals and is preferably kaolin, from which metakaolin is developed when calcinated. The known properties of metakaolin, which improve the properties of cements of the Portland type, are thus combined with a property that is considerable for the hardening reaction of concrete described above, which cannot be provided when using metakaolin in a pure powder form.

FI patent application 20012116 describes in detail a process for manufacturing porous particles, which can be used in the present invention. They are characterized in comprising metakaolin agglomerates, the size of which is 2-100 micrometres and which have an open pore structure, whereby the density of the surface part of the metakaolin agglomerates is lower than that of the inner part, and their pore structure in the surface part and the inner part is similar.

More specifically, the binder admixture according to the invention is mainly characterized in that, which is presented in the characterizing part of claim 1.

The process according to the invention for manufacturing a hydraulically hardened binder mass is characterized in that, which is presented in the characterizing part of claim 12.

The calcinated kaolin according to the invention is characterized in that, which is presented in the characterizing part of claim 18, and the process for manufacturing the same is characterized in that, which is presented in the characterizing part of claim 19.

The invention provides considerable advantages. Accordingly, it considerably improves the manufacturing methods of cast concrete products and shortens the production times, as well as provides concrete with better mechanical and chemical properties and improves the fire and frost resistance of concrete.

By means of the invention, part, preferably at least 5% by weight, preferably as much as 35% by weight, of a conventional hydraulic binding agent, such as cement, e.g., Portland cement, and/or furnace slag can be replaced, and, nonetheless, the binder admixture can be provided with good or even improved properties. The mixture is easy to work; it stiffens quickly after processing and gives the concrete a good final strength.

As stated above, various kaolin products can be provided according to the calcination conditions. A product having an exothermic crystal structure is well suited to paper filling and coating material of paper.

BRIEF DESCRIPTION OF THE DRAWINGS

FIGS. 2A-D show schematically, how the MKAs between cement particles even out the distribution of hydration products;

DETAILED DESCRIPTION OF THE INVENTION

Figure 1:
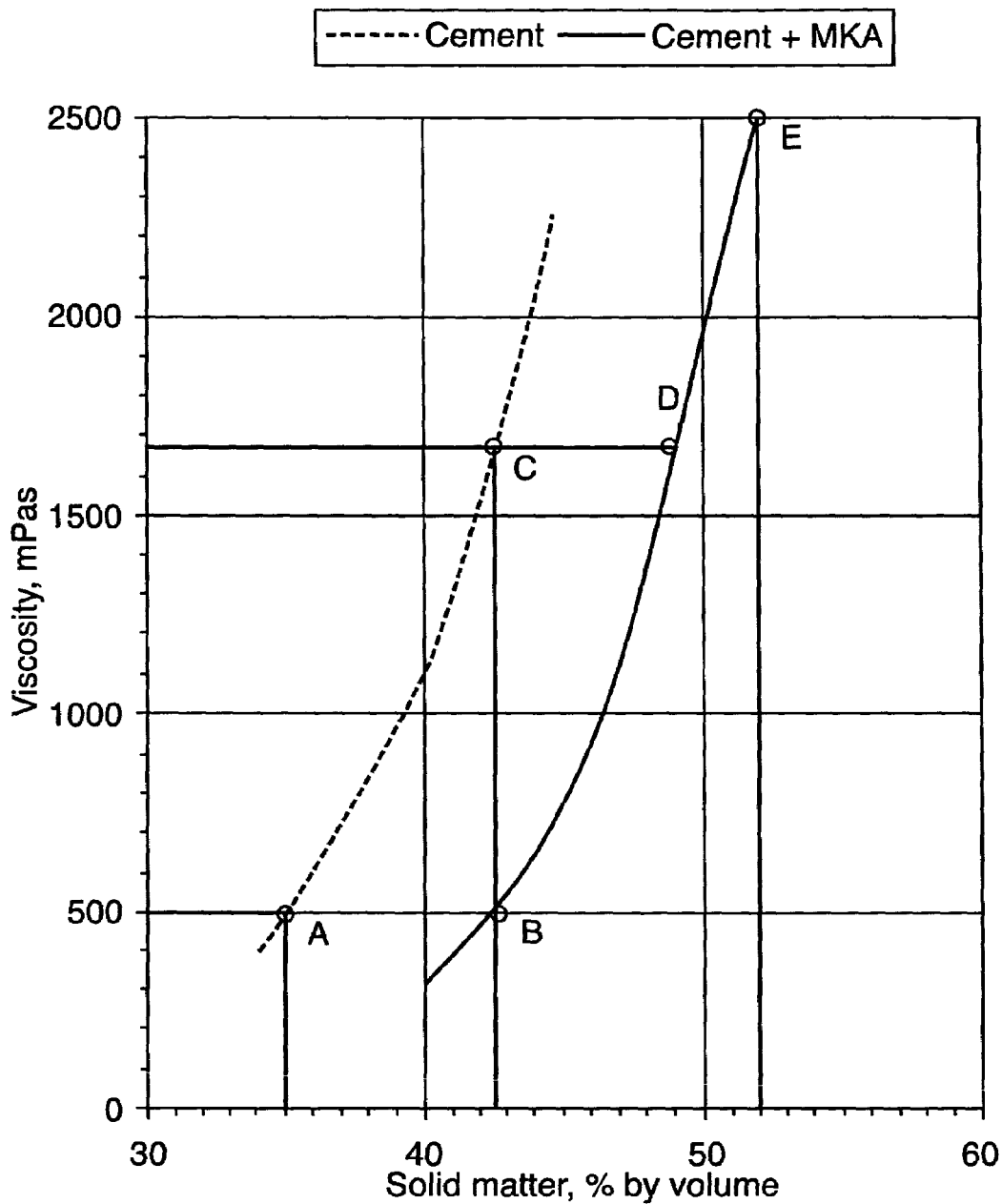
FIG. 1 is a graphical representation of the effect of metakaolin on the viscosity of cement paste, whereby viscosities measured of various binder masses (without the stone aggregate) by the Brookfield viscosimetre are given as the function of solids volume (Example 1)

In the following, the invention is described in detail, particularly using the manufacture of the product suitable for the admixture of concrete and its use as examples. First, however, a few comments on kaolin and its calcination.

Calcination of Kaolin

The raw material in the process according to the invention are kaolin (natural kaolin) and possible admixtures, such as calcium carbonate or silica, and the proportion of binder is typically very low (less than 1%). Instead of granules, the process forms agglomerates. In granules, the film formed by the binding agent defines the size of the granule and a larger inner pore structure. In agglomerates, the pore structure is a consequence of particles locking to each other, enabling the manufacture of agglomerate with a strong design so that only the surface layer is sintered, whereby bonding necks are formed between individual particles.

It is typical of the agglomerate that
1. The shape is indefinable, showing a tendency towards spherical, however
2. The pore structure extends in an essentially homogeneous form throughout the agglomerate
3. The amount of binding agent is minor (<2%) or nonexistent; therefore, the film formation in connection with drying has no effect on the structure
4. Charges of opposite signs acting on the surfaces and the edges of the platy particles have an effect on the pore structure of the kaolin agglomerate
5. The agglomerate strength is good because of the bonding forces induced by the charges
6. The structure is porous, because it has a low degree of organization 7. The agglomerate is developed, when the dry content of its raw material, the slurry, is high, typically about 70%, whereby the structure of the drop created in spray drying is locked before any essential inner organization is allowed to take place
8. The size of the agglomerate is very much dependent on the drop size. Capillary forces are the only ones that have a decreasing effect on its final size.

Calcinated kaolin is a common term for kaolins, the crystal structure of which is modified by thermal treatment. The temperature and the duration of treatment have an effect on the final crystal form. When the processing temperature is less than 1000° C. (typically 500 ... 700° C.), an essential part of the water (c. 14%) contained by it and bound to its crystal structure exits the crystal structure of the kaolin. In that case, a mainly amorphous crystal structure is formed. Generally, the time needed is less than 5 seconds.

As the thermal treatment is continued, the temperature increased and the processing time prolonged, the amorphous structure again begins to crystallize, causing a slight exothermic phenomenon. The crystal structure thus created deviates from the original crystal structure of kaolin and from the metakaolin, which was produced as an intermediate product. Generally, the product is called calcinated kaolin. The Ti compounds that frequently occur as impurities amongst the kaolin also change their crystal form and turn white, increasing the brightness of the product by about two ISO units of brightness, which is significant for the purposes of the commercial product. This change takes place at about 1000 ... 1200° C., particularly at about 1100 ... 1200° C. at a retention time of about one hour. When the slate-like crystal scales open, the surface of the product is rough.

Metakaolin agglomerate has an agglomerate structure and it is obtained, when the kaolin agglomerate has been treated thermally at a temperature of 600-1000° C., the processing time being 0.1-5 sec. In that case, the crystal water leaves the agglomerate and obtains pozzolanic properties. In some products, it is preferable to use metakaolin agglomerate, the surface of which is metakaolin and the inner part kaolin (or only a very few of its inner parts have lost their crystal water).
4. When acidic Ca carbonate, $Ca(HCO_3)_2$, is used, Ca oxide, CaO, is obtained as a sintering auxiliary agent for kaolin surfaces that have no crystal water, the Ca oxide combining with water and forming Ca hydroxide, $Ca(OH)_2$, and reacting with the metakaolin surface. 5. Other suitable substances, such as silica sol, Na silicate (e.g., soluble glass) or nepheline cyanide can also be used as binding agents.

To manufacture kaolin agglomerate that has an exothermic crystal structure, the kaolin agglomerate is calcinated into metakaolin in a first phase, the radiation temperature being about 1200° C., and typically about 2% of a sintering auxiliary is used, whereby the pore structure of the surface mainly closes. The metakaolin agglomerates are transferred into a calcination furnace, wherein the change in crystal structure, which requires time (about one hour), takes place at a temperature of about 1200° C.

When the product is calcinated agglomerate, it is generally characterized in that:
1. The degree of calcination of the agglomerate corresponds to the crystal structure created after the exothermic reaction
2. The pore structure of the surface part is closed
3. The density of the agglomerate in the cross section is constant
4. The agglomerate has good optical properties.

The use of kaolin as the metakaolin agglomerate according to the invention and as agglomerate having a crystal structure of the exothermic area diversifies the product application possibilities of kaolin compared to the ones presently used.

Binder Admixture and a Process for Preparing the Same

A particular object of the invention is a binder admixture and a process for preparing a hardened binder mass (such as concrete). The binder admixture consists of an admixture, hereinafter also called the "multifunctional admixture of concrete", which cooperates with hydraulically hardening binding agents, such as Portland cement, furnace slag or other commonly used cement-bearing binding agents. The grinding fineness of the cement is not critical; it can be, for example, 50-1000 $m^2$/kg, particularly about 100-800 $m^2$/kg, generally, the fineness of Portland cement is about 350-560 $m^2$/kg and than of furnace slag cement slightly higher (600-750 $m^2$/kg).

The additive consists, for example, of pozzolanic, porous, spherical agglomerates provided by a special burning method described in detail below, which are in the order of cement granules, and which have been provided with a capability to absorb, in real time, the water surplus added in connection with the manufacture of concrete. When these agglomerates are used, the concrete is easy to work at the beginning, but when the additional water has been absorbed into the agglomerates, the concrete stiffens quickly. The spherical shape of the agglomerates furthers the workability of concrete.

In the following, the agglomerates are also referred to as "MKA" (metakaolin agglomerate).

At a later stage, this additional water that has been stored evenly throughout the matrix will be utilized to minimize the inner drying of concrete (autogenous shrinkage) and the resulting microcracking. This is a very important issue for concretes with a low water-cement ratio, such as about 0.3-0.4, in particular. The invention can be used to increase the water-cement ratio. Curing concrete surfaces according to present technology, which is carried out by water spraying only, does not provide the additional water inside the concrete, which is needed to compensate for autogenous shrinkage.

When the particles are originally of a suitable size and there are so much of them that their mutual distance from one another (the spacing factor) corresponds to the requirements for frost resistance according to modern standards, the spherical pores, which have been emptied of water, improve the frost resistance of concrete in use.

The raw material for the manufacture of the agglomerate used in the invention is kaolin (natural kaolin) and possible admixtures, such as calcium carbonate or silica, and a possible binding agent, such as calcium hydrogen carbonate or silica sol. Typically, the portion of binding agent is minor (typically 0.5-2, normally less than 1%). The binding agent can be dissolved in water.

Slurry with a high dry content is formed from the source material. Drops are formed from the slurry and it is dried using the spray drying method. Instead of granules, agglomerates are formed by the process. The pore structure of the agglomerates is the result of particles locking to each other, enabling the preparation of agglomerate with a strong structure so that only the surface layer is sintered, whereby bonding necks are formed between individual particles.

The size range of the agglomerates is 2-200 micrometres, typically 5-100 micrometres. Agglomerates with a size (d50) of 20-100 micrometres are preferably used in the binder admixture. In the manufacture, the size of the drops is in the same order, preferably about 5-50% by volume, typically about 7-20% by volume, preferably about 10-15% larger than that of the agglomerates obtained as a product.

The kaolin agglomerates obtained from drying are taken to thermal treatment. The surface of the agglomerate in particular is treated with heat (calcinated) at a temperature, where the crystal water evaporates. Normally, the thermal treatment is carried out at about 570-1000° C. (at about 600-1000° C.). When the crystal water exits, the kaolin turns into metakaolin. The crystal water forms about 14 percent of the weight of the kaolin. If all the crystal water has not been able to exit after the thermal treatment, the inner part of the agglomerate may at least partly remain kaolin.

In the manufacturing process, agglomerate is thus formed first and treated thermally to form metakaolin. When so desired, the thermal treatment can be continued to prepare a calcinated product.

The agglomerate used in the invention is characterized by an open pore structure, i.e., it has "open pores", meaning that water is free to move from the inner parts of the agglomerate onto its surface. In this sense, the agglomerate according to the invention deviates from the granule used for paper coating, for example, wherein the surface layer is dense and no water or vapour can freely flow through it. The present agglomerates have also been defined as to having "a pore structure that is essentially similar in the surface part and the inner part". This refers to the open pore structure disclosed above. In practice, the pores can be smaller in the surface layer of the agglomerates than in their inner parts. However, they are always essentially open in order to allow water to move in and out of the agglomerates.

The Ca carbonate, which can be used as an additive/admixture in the manufacture of the agglomerates, is calcinated into Ca oxide, releasing, at the same time, gaseous carbon dioxide. This fills at least some of the agglomerate pores. Alternatively, the agglomerate is formed from kaolin only, whereby its surface is changed into metakaolin by thermal treatment, while the crystal structure of the inner part remains kaolin.

The surface tension in the drops tends to organize the agglomerates in an essentially spherical form. The agglomerates according to the invention are spherical in that their deviation from the shape of a ball is smaller than 30%, preferably smaller than about 20%, most preferably smaller than about 10%.

As stated above, the agglomerates typically have an open, porous structure, whereby the pore structure extends essentially homogenously throughout the whole agglomerate. Generally, the portion of pores from the agglomerate volume is about 20-80% by volume, preferably about 30-70% by volume, most preferably about 40-60% by volume. The size of individual metakaolin/kaolin particles ranges fairly extensively, but generally it is about 0.1-50 micrometres, usually about 0.5-40 micrometres.

It should be mentioned that the agglomerate structure is porous, because its degree of organization is low. As no binding agent is added into the slurry, or there is not a lot of it (<2%), therefore, the film formation that takes place in connection with drying does not affect the structure.

Charges of opposite signs, which act on the surfaces and the edges of the platy particles, affect the pore structure of the kaolin agglomerate. The strength of the agglomerate is good because of the bonding forces induced by the charges.

The agglomerate described above is generated in particular, when the dry content of its raw material, the slurry, is high, typically over 50% by weight, preferably over 60% by weight, usually 60-80% by weight, whereby the structure of a drop generated in spray drying is locked before any essential inner organization takes place.

The invention provides a process for preparing a hydraulically hardened binder mass. In such a process, a paste-like composition is formed from a hydraulically hardening binding agent, a pozzolanically reacting admixture and water, containing, if so desired, stone aggregate or a similar filling agent. The paste-like composition is worked (mixed/vibrated and cast, etc.) by a process known per se so that it becomes homogenous, and the worked composition is allowed to harden to form the binder mass.

At the initial stage of processing the concrete (e.g., casting), the water required by the processing begins to penetrate the pore structure of the porous agglomerates in the binder admixture so that the pores in question become partly filled.

The need for special plasticizers decreases because of the improvement in the workability, which is caused by the round shape of the agglomerates. It could even be harmful to use them, if they bound themselves partly to the particle surfaces that should be as reactive as possible.

As the manufacturing process of the said agglomerates leaves the said pores filled with gas, which is either air, carbon dioxide or a mixture thereof, the gas must exit the pores so that water can penetrate them. It has been observed that the said microbubbles plasticize cement paste. The portion of carbon dioxide in the discharging gas reacts with free calcium hydroxide and forms calcium carbonate.

The outermost strong coat of the particles has effectively been made highly pozzolanic and preferably further coated so as to be alkaline, whereby hardening starts quicker and the final strength is higher. Furthermore, because of the pozzolanic property and the structure of the particles, they provide, together with the cement, a better matrix as regards the long-term durability of concrete.

Generally at least 50% by weight of the mixture formed from the binding agent and the admixture consists of a hydraulically hardening binding agent, such as cement (e.g., Portland cement) or furnace slag. About 35% by weight, at the most, consists of the pozzolanically reacting metakaolin agglomerate described above. Generally, the average size (d50) of the porous agglomerates is 5-200 micrometres, preferably over 30 micrometres, as stated above. The average size (d50) of the agglomerate is most preferably the same or essentially the same as the average size (d50) of the particles of the cement-containing binding agent used in the mixture.

When using agglomerates that have such a size and an amount that, in the mixture, their mutual distance from one another (the spacing factor) is less than 200 mlcrons, on the average, the porous agglomerates emptied from water in the hardened mixture are able to improve the frost resistance of concrete. This feature is examined in detail below.

The binder admixture can be hardened from one containing agglomerates to form a binder mass, which has a porous matrix formed from strong agglomerates, the distance between the pores in the matrix being 5-500 microns, preferably 20-100 microns. It can especially be hardened to form such a hardened binder mass, the 28d compressive strength of which is 60-160 MPa, preferably 80-120 MPa.

In the following, the properties of the agglomerates in cement mixes and concretes are described in detail.

The advantages of using metakaolin in connection with Portland-type cements are well known.

The most important advantages are:
1. They increase the strength, the durability and the brightness of concrete.
2. They prevent the harmful alkali-silica reaction.
3. They decrease the harmful effect of acidic substances on concrete
4. They decrease the formation of lime mildew that often forms on the surface of concrete.

The strength gain is based on the fact that metakaolin as pozzolan decreases the amount of thus created calcium hydroxide in the hardening cement mass. Because of its cleavage faces, which form easily, calcium hydroxide is a weak link in the cement matrix. At the same time, it reduces the porosity of the hardening concrete and tightens and decreases the thickness of the so-called transition zone, whereby the bonding force between the cement and the stone aggregate increases. It has been observed that metakaolin reacts with such an amount of calcium hydroxide, which is greater than the added metakaolin, being as much as 2-5 times more effective than other pozzolans commonly used, such as fly ash. Metakaolin does not slow down the hardening reaction. Generally, the final strength is better than that of concretes without metakaolin.

The growth of the durability of concrete is manifested in various ways. The use of metakaolin improves, among others, resistance to sulphates and chlorides and reduces any problems caused by freezing. Resistance to acids is also improved. Metakaolin tightens the concrete structure, whereby it decreases the amount of harmful alkali metals and chlorides in the water, which is entrapped inside the pores, and decreases the penetration of chlorides into the concrete matrix. It has been observed that, from the point of view of water absorption, pores of 0.05-10 microns are significant. As metakaolin reduces the number of these pores, both the absorption volume and rate of water decrease. Although metakaolin increases the acidity of the pore water; nonetheless, it always remains over pH 12.5, which is considered a recommendable value from the point of view of steel corrosion.

Metakaolin has not been discovered to have any harmful effects on the use of plasticizers and accelerants.

The effect of metakaolin on the so-called alkali-silica reaction is based on the fact that it reacts with the calcium hydroxide thus created, and thus prevents any disadvantages caused by the gel created by the reaction between the calcium hydroxide and active silica. The gel expands and causes quick disintegration of the structure in a saltbearing environment in particular.

The use of metakaolin in the prevention of lime mildew is also based on binding free calcium hydroxide. Perfect prevention of mildew requires the use of larger dosages; therefore, it cannot be removed completely by means of the dosages commonly used.

The use of agglomerates provides considerable advantages, among others, an improvement in workability, growth of the early strength, and a high final strength.

The shape of the agglomerate according to the invention is spherical. The volume taken by them from the volume of the binder mass is preferably about 50%. In that case, in an optimal mixture, the cement particles and the agglomerates of essentially the same size are fully mixed and in the immediate vicinity of each other. The spherical agglomerates improve the rheological properties, i.e., the fluency and workability of the mixture without using separate plasticizers.

FIG. 1 shows viscosities measured of different binder masses (without stone aggregate) by means of the Brookfield viscosimetre as a function of volume of the solid matter (Example 1). The figures clearly show, that when MKA is used as part of the binder admixture, its degree of viscosity is clearly lower. In the situation presented, ⅓ of the cement was replaced by an addition of MKA having almost the corresponding volume (⅙). The smaller weight fraction of MKA can be explained by its lightness (about 1.1 kg/dm3) compared with cement (the density is 3.1 kg/dm3). As it is significant for the reactions and interactions between the particles, the proportion of volume parts is examined herein in particular.

The general compression density of Portland cement (the volume part of the solids from the binder mass) is about 40%. According to measurement, the viscosity is then 1120 mPas. The corresponding compression density of the mixture, into which MKA was added, on the same degree of viscosity is higher, i.e., 47%.

If the object is to provide a structure according to a cubical packing of spherical particles of a theoretically uniform size, the corresponding compression density is then about 52%. This can be provided by the addition of MKA, whereby the viscosity is about 2500 mPas, which can still be worked but, however, not very well. For conventional Portland cement, this compression density cannot be achieved at all within the limits of workability without the addition of other possible chemicals.

To achieve sufficient workability, concrete needs more water than the hydration of the cement that works as the binding agent. As concrete needs a certain amount of cement paste, the amount of water cannot be influenced by means of reducing the amount of cement. Generally used fine-grained admixtures, such as silica, do not decrease the amount of water but only divide it into an even more fine-grained form.

Neither does MKA reduce the amount of water more than its spherical shape and pore structure allow. It is essential that the excess water can be stored in a reversible manner in the strong porous structure of the agglomerate.

Between cement particles, there are agglomerates that are suitably proportioned, whereby they work as 'bridges', when the cement particles are hydrated, thus reducing the length of travel of the hydrates (FIGS. 2a-d). Because of the lower density of MKA, a proportioning between the particles can be provided by means of a moderate addition of MKA, wherein MKA is in the immediate vicinity of the cement particles.

After the water required by processing has been absorbed into the pore volume of the MKAs, the cement particles and MKAs approach each other and the cement paste stiffens quickly, which is significant for the economy of construction engineering. In that case, shuttering can be detached earlier than at present.

Example 2 describes the ability of MKA to absorb water into its pore structure. This property can be adjusted in connection with the manufacture of MKA, for example, by changing the conditions of calcination and, thus, the porosity of the agglomerate surface. The phenomenon can also be influenced by providing calcium oxide onto the agglomerate surfaces in connection with the manufacture, which calcium oxide reacts with the carbon dioxide entrapped in the agglomerate after obtaining some moisture.

Efforts have been made to influence the rate of the strength gain of cement and the 28d strength gain by increasing the grinding fineness of the cement, i.e., releasing the entire cement reserve within a shorter period of time. However, increasing the grinding fineness has the disadvantage that, after the cement has fully reacted at the initial stage of its life span, no inert cement and strength potential are left to be used for subsequent damage of the concrete matrix, but the damage can advance easier than if coarser and slower reacting cement had been used.

The said problem can be solved using metakaolin as the admixture of the cement. Coarser cement can be used and, nonetheless, a high early strength can be achieved, and the inert portion of the cement remains and increases the long-term durability of the concrete. This is based on the fact that the space of cement hydrates that is to be filled has been decreased and the length of their travel shortened.

A theory presented by Verbec-Helmut [1] deals with the effect of a dense hydrate layer on the strength and the low solubility of the hydration products of cement and the drift of diffusion products and the resulting non-uniform distribution. This theory and the calculation model presented by Neville [2] have been used to illustrate the invention in the following. No stand is taken here regarding the validity or the accuracy of the appended calculation model, but it has been discovered to correlate with obtained measurements and to facilitate the calculative examination of the process.

The effect of the dense hydrate layer on the strength can be explained by means of the ratio between the volume of the hardened cement gel and those of the hydrated cement and capillary pores. The strength of the cement increases, when the ratio between the gel volume and the corresponding available space increases. When the ratio of the volume of hardened cement gel to the sum of the volumes of cement gel and free water is about 2.06-fold, the ratio can be expressed by means of the following formula:

$$X = \frac{2.06\, v_c c\alpha}{v_c c\alpha + W}, \text{ wherein} \qquad (1)$$

$v_c$=specific volume of cement, dm$^3$/kg
c=weight of cement, kg
α=degree of hydration
W=water volume, dm$^3$ Example 3 shows an example of the use of the formula in evaluating the cement strength.

The non-uniform distribution of the hydration products of cement is clearly demonstrated, when heat is used to accelerate the hydration. The location of agglomerates between the cement particles and the increase in solids proportion shorten the length of travel of the hydration products, while the binder admixture hardens and, at the same time, decreases the non-uniform hydrate distribution. The so-called failure of final strength that occurs in connection with the heat treatment of concrete is mainly the consequence of a non-uniform hydrate distribution.

Figure 3:
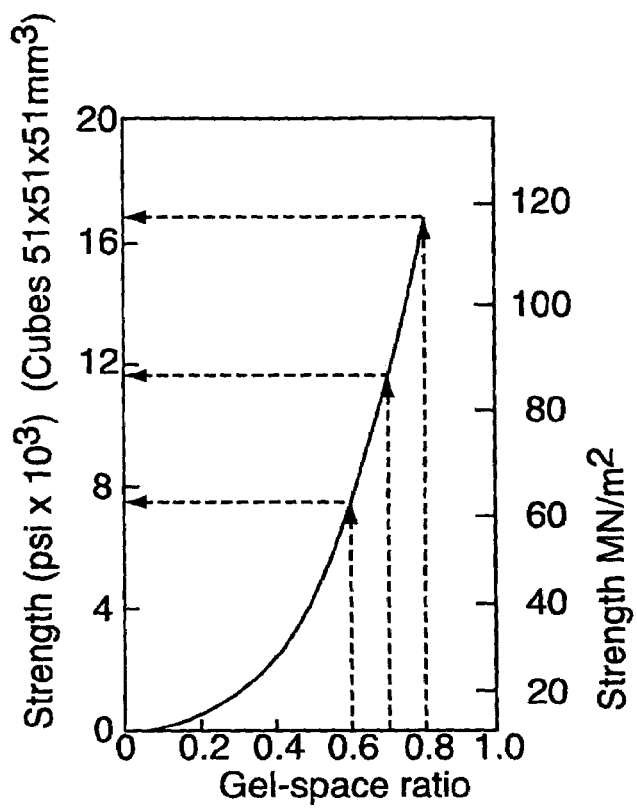
FIG. 3 is a graphical representation of the effect of the uniformity of gel distribution on the compressive strength of cement.

FIG. 3 shows the effect of the uniformity of gel distribution on the compressive strength of cement. When hardened cement has a certain gel-space ratio and the distribution of hydration products is uniform, better strength is achieved than if the gel-space ratio of hardened cement is approximately the same but the distribution of hydration products is non-uniform. In that case, namely, those parts of hardened cement, wherein the gelspace ratio is lower than average, limit the achievable strength.

Low solubility and diffusivity of the hydration products of cement complicate the capability of the products to substantially move from the surface of a hydrating cement granule during quick hydration.

Modern concreting technology requires the acceleration of concrete stiffening by means of heat. This results in the so-called final strength failure, i.e., a nonuniform distribution of hydration products. The schematic presentation of FIG. 2 shows how the MKAs between cement particles even out the distribution of hydration products.

The use of MKAs results in only a minor failure of the final strength caused by the accelerated stiffening of concrete.

One important advantage, which can be achieved by means of the invention, is the prevention of the formation of micro-cracks in concrete.

The most common reasons for the microcracks in hydrated cement or concrete are as follows:
- the amount of mixing water is greater than that of hydration water, whereby pores remain
- certain intermediary products of hydration have larger volumes than the final products, so because of the fluctuation in volume, the matrix breaks or retains tensions
- at the gelling stage, the solid gel expands and binds a larger amount of water than the final crystallized product
- internal generation of heat provides thermal strain
- the different components of concrete and/or plaster have different elastic modulus, whereby strain is not evenly distributed
- the binding agent has not been evenly distributed
- the finer particles of binding agent have formed agglomerates, between which not even water can penetrate in normal mixing of concrete or plaster
- no bonding forces are generated on the surface of the filler or the stone aggregate to keep the material together on the interface between the binding agent and the filler.

Figure 4:
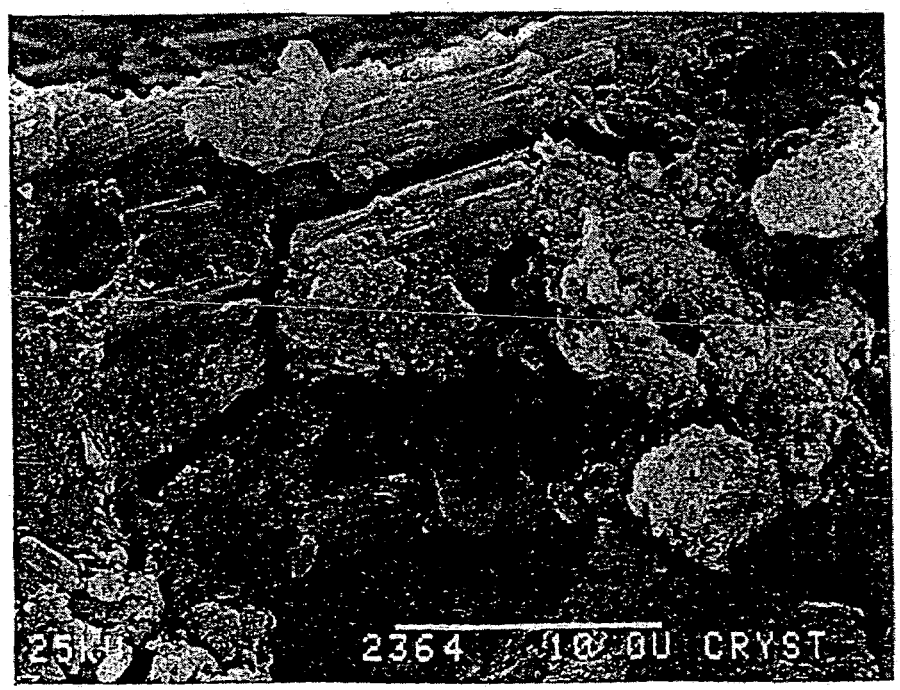
FIG. 4 shows an electron microscope image of a typical microcrack.

FIG. 4 shows a typical microcrack.

As far as the size and dosage volume are concerned, MKA is close to the hydratable Portland cement particle, whereby it works as a certain kind of a pressure accumulator decreasing the pressure and tension peaks.

Figure 5:
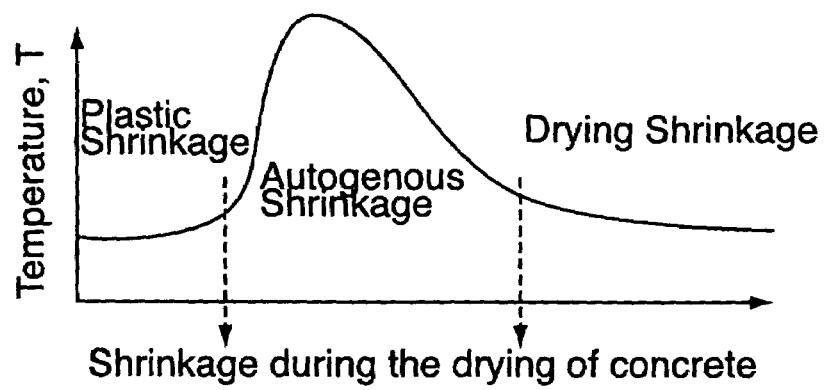
FIG. 5 shows schematically the different phases of the drying of concrete and those of the resulting shrinkage.

MKA can primarily be used to affect the so-called autogenous shrinkage. When the value of the water-cement ratio is less than 0.42, the chemical shrinkage of cement starts to dominate and become harmful, when the total amount of water is not enough for complete hydration. The volume shrinks by 8% when the cement reacts. In that case, a partial vacuum of as much as 100 kPa develops inside the matrix, and, if no water is then available, microcracking occurs. FIG. 5 shows schematically the different phases of concrete drying and the resulting shrinkage.

Under the effect of partial vacuum and heat, MKA delivers some of the water it has stored in its pore structure, concentrating the risk of microcracking on its own strong structure.

The need for water comes in impulses and MKA balances it. The amount of water stored in MKA roughly corresponds to the difference between the amount of water required by the workability of the paste formed from the binding agent and the admixture and the smaller amount of water needed by the hydration reactions. In other words, the water, which is redundant for hydration, but which, however, is necessary for processing the mass, is temporarily transferred to a storage formed by the agglomerates, from where it is released during the hardening of the mass, the final hardening in particular, which can be used to prevent the formation of microcracks, among others (see below). Furthermore, the pores absorb gas, such as air, from the concrete mass after being released from water, improving the strength of concrete.

Figure 6:
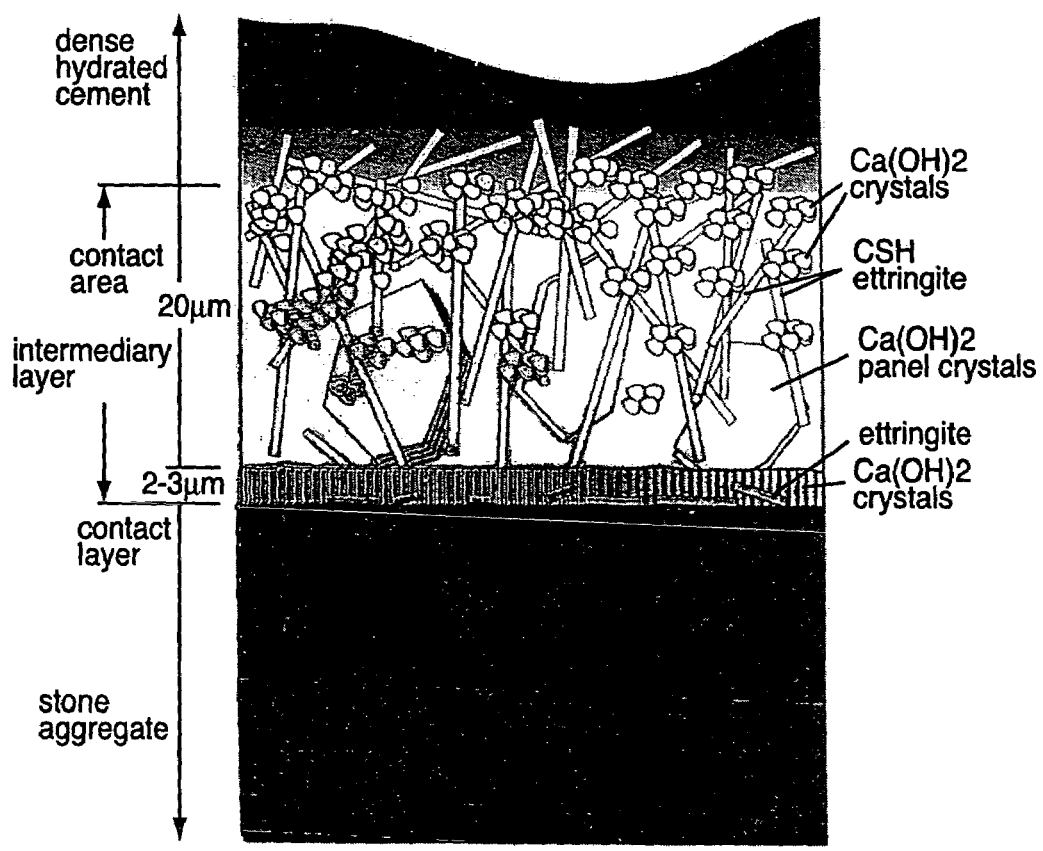
FIG. 6 shows schematically the structure of the bonding between hydrated cement and stone aggregate.

The stone aggregate used in concrete always contains microcracks. For example, granite, which mainly consists of the following minerals: orthoclase, biotite and quartz. Biotite by nature is slate-like and cracks easily. Microcracks also easily occur on the interfaces of various minerals. When the stone aggregate is surrounded by a strong cement matrix, the growth of microcracks is prevented and, at the same time, the cement matrix and the stone aggregate start working as an integral product, whereby the original difference in their elastic modulus is no longer significant. The density of the transition zone between the cement and the stone aggregate is about half of that of Portland cement (FIG. 6). The character of the said transition zone changes in a cement matrix that is blended with MKA. Metakaolin reacts with calcium hydroxide, the agglomerate provides the matrix with a strong spherical structure, and it binds the silicate zone with 'bridges', the distance of which from each other is about 20-40 microns. In addition, MKA removes excess water from the vicinity of the stone surface, which is one of the reasons for the sparse structure of the transition zone.

When examining hardened concrete by means of a microscope, it can be observed that a fairly big part, as much as half of the surfaces of the stone aggregate, can be improperly attached or even off the cement matrix. There are a lot of reasons for this problem; among others, firm engagement of air gases to the outermost surface layer in addition to moisture and stone dust at the moment of crushing, the shape of the stone aggregate, the mixer efficiency has not matched to the stiffness of the concrete, the gas phase on the stone surface has not been able to detach, the cement particles do nothing but pointedly touch the stone surface, and there is relatively more water on the surface, whereby a locally high water-cement ratio, dust concentration of the stone aggregate, a strong local shrinkage of the cement matrix are provided, the capillary water of the cement accumulates onto the surfaces of the stone aggregate, causing capillary porosity on the surfaces, or air is not allowed to exit in connection with casting. MKA, for its part, eliminates some of the shrinkage of the hydrated cement and the accumulation of capillary pores, and helps gases to exit the concrete because of the low viscosity.

Several facts affect the uneven distribution of the binding agent, the effect of which cannot be totally eliminated by means of the properties of the binding agent only. These include the shape of the stone aggregate and the dust concentration on its surface, or the use of too low an energy intensity in mixing. The spherical shape of MKA decreases the viscosity and the dilatant nature of the binding agent paste, whereby the same energy intensity of mixing provides a better binding agent distribution in the concrete. When the water bound to the surface of the stone aggregate is absorbed into MKA, it cannot affect the water-binder ratio. The dust bound to the surface of the stone aggregate obtains more moisture under the effect of the moisture obtained through MKA, whereby a better contact between the stone aggregate and the binding agent is provided.

As can be observed from the examples above, MKA decreases the pores and microcracks of the binding agent paste. They have the effect of improving the joining of the binding agent, the aggregate (the-stone aggregate) and steels together. The tensile stresses of concrete burden the steels, the extension of which in loading exceeds that of concrete. While concrete does not crack after casting, the surface area of concrete, which is larger than that of steels, receives so much loading that the extension of steels induces no cracking.

A substantial part of Portland cement consists of clusters of core particles (5 microns) and smaller (2 microns) particles, which surround them. The van der Waals forces between the particles are so weak that effective mixing can disperse the particles from each other. However, the mixing processs presently used are generally not capable of doing this. When MKA is used, the cement can be rougher-grained, whereby the amount of fines contained by it and also the problematic agglomerates that have not been broken up is smaller.

The porous agglomerate according to the invention improves the fire resistance of concrete by various mechanisms. The agglomerates reduce the number of capillary pores and, thus, also the amount of free capillary water, because the water is absorbed inside the strong agglomerates. Because of an advantageous volume-surface area ratio, the spherical shape and the sintered structure of the agglomerate provide good pressure tightness.

As part of the cement normally used is replaced with the agglomerate, the amount of free calcium hydroxide, which disintegrates in the heat induced by fire, decreases. In connection with the hardening of cement, about 25% by weight of calcium hydroxide is generated from the cement. The disintegration reaction of calcium hydroxide that takes place in the heat provides one mole of water per each mole of calcium hydroxide. As the water is inside the hardened cement structure, it can, when heating up, provide a pressure of as much as 1000 bar, if the structure withstands.

The porous agglomerate reduces the amount of calcium hydroxide in two ways. On the one hand, using pozzolanic binder agglomerate can actually decrease the amount of cement by 30%, for example. The amount of calcium hydroxide thus generated decreases in proportion. On the other hand, the pozzolanically reacting agglomerate reacts with free calcium hydroxide so that one mole of metakaolin reacts with at least one calcium hydroxide mole, further decreasing the amount of water generated by the heat, and thus improving the fire resistance of the concrete.

Figure 7:
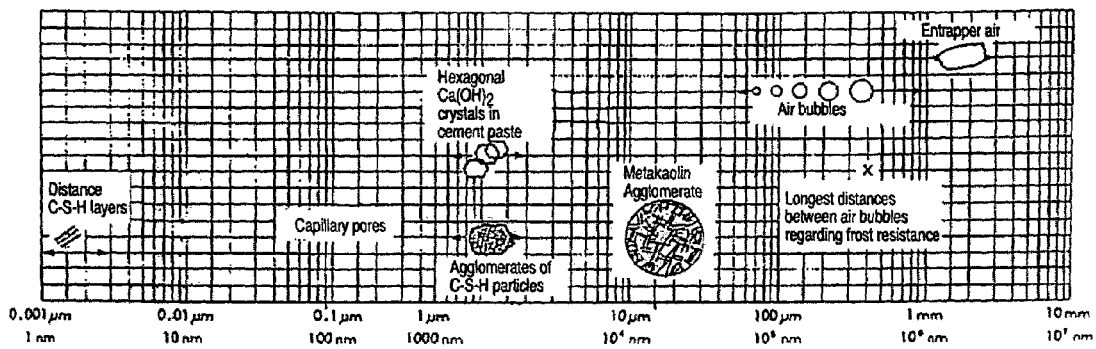
FIG. 7 shows schematically the magnitudes of the particles and the pores in the hydrated cement paste.
Figure 8:
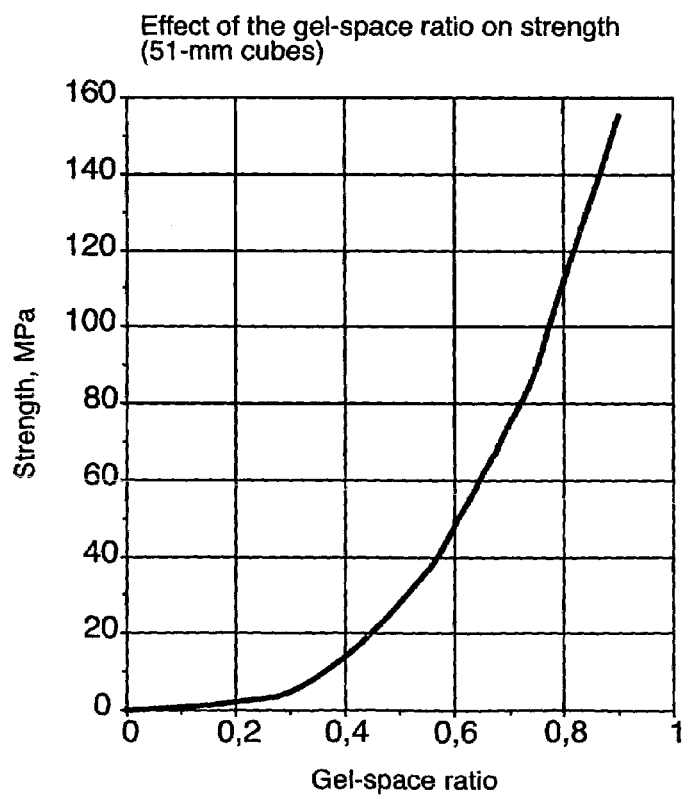
FIG. 8 is a graphical representation of the effect of the gel-space ratio on the strength.
Figure 9:
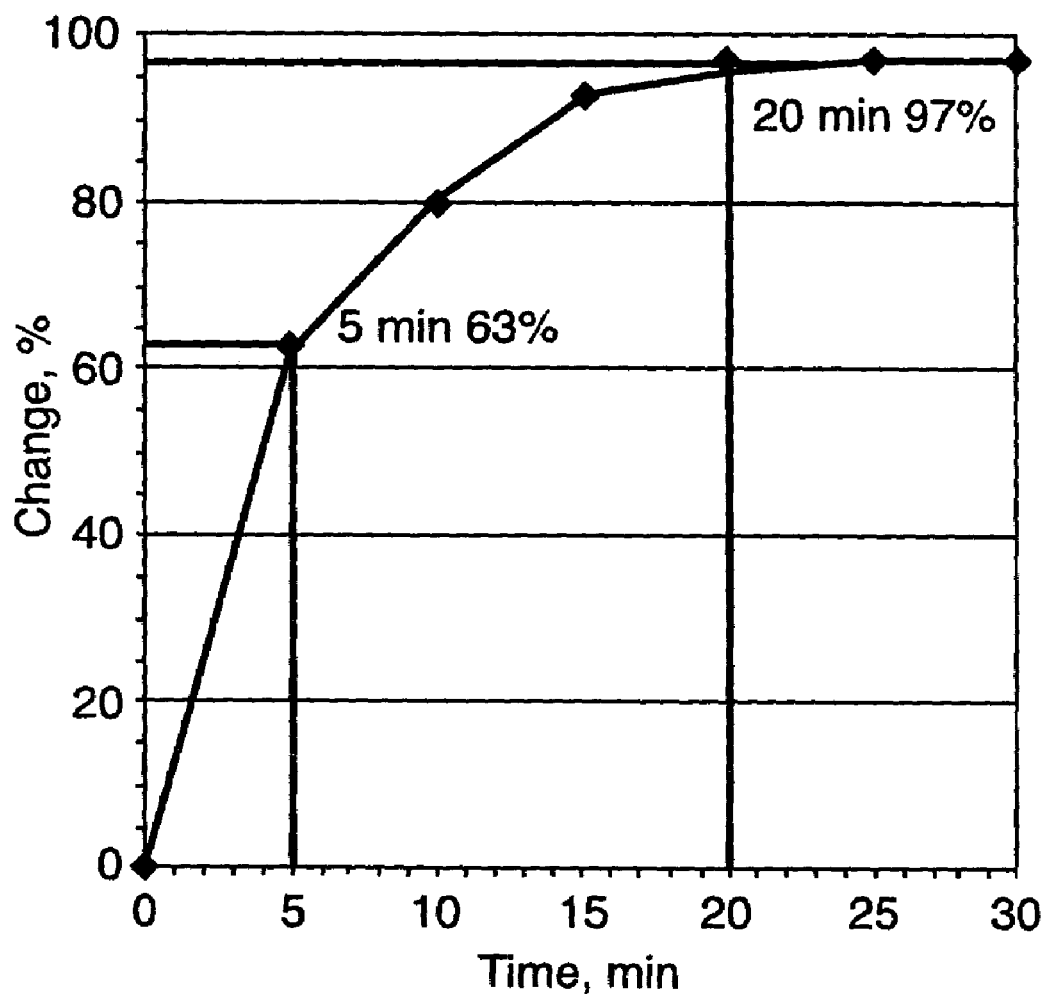
FIG. 9 is a graphical representation of the absorption of water of metakaolin agglomerates as the function of time.

The frost resistance of concrete can be improved, among others, by adding air pores into the cement mass. It has been observed that pores of a size of 50-200 microns, the mutual distance between which is less than 200 microns, provide concrete with good frost resistance. FIG. 7 shows schematically the magnitudes of the particles and pores in the cement.

When the amount of porous agglomerate according to the invention is 20% by volume of the amount of binder, a pore structure is provided that has pores with a size of 50 microns at an average distance of about 100 microns from each other.

In has been observed that the penetration of water into the agglomerate pores can be accelerated, with certain limitations, by means of mechanical methods, among others, which are generally used in dampproofing concrete, such as vibration and pressurization.

As the reaction of cement with water, i.e., hydration, advances, more water is obviously needed; especially when the water-cement ratio used is low. The surface of the concrete that is hardening by means of conventional technology is moistened. However, as now only the surface parts obtain the necessary additional water, this is not the most advantageous practice for the optimal hardening of the structure. It is more preferable, if the extra water needed by the hardening reaction is near each cement particle in the entire structure. The hardening of cement is an exothermic event, which results in an increased temperature and an increase in the pressure of the residual gas in the agglomerate pores, contributing, at this stage, to the transfer of water outside the agglomerate. The under-pressure and diffusion, which are generated in connection with the hardening reactions, also have an effect on this transfer. The volume left by exiting water is partly replaced with the air in the concrete, water vapour and the expansion of the gas still remaining in the pores. As the gas volume contained by the agglomerates provides a sufficient protection against frost, the use of extra air (typically 6% of the cement volume) utilized according to conventional technology for improving the frost resistance is no longer necessary.

The appended drawings 10 to 12 illustrate in detail the process and the equipment according to the invention.

Figure 10:
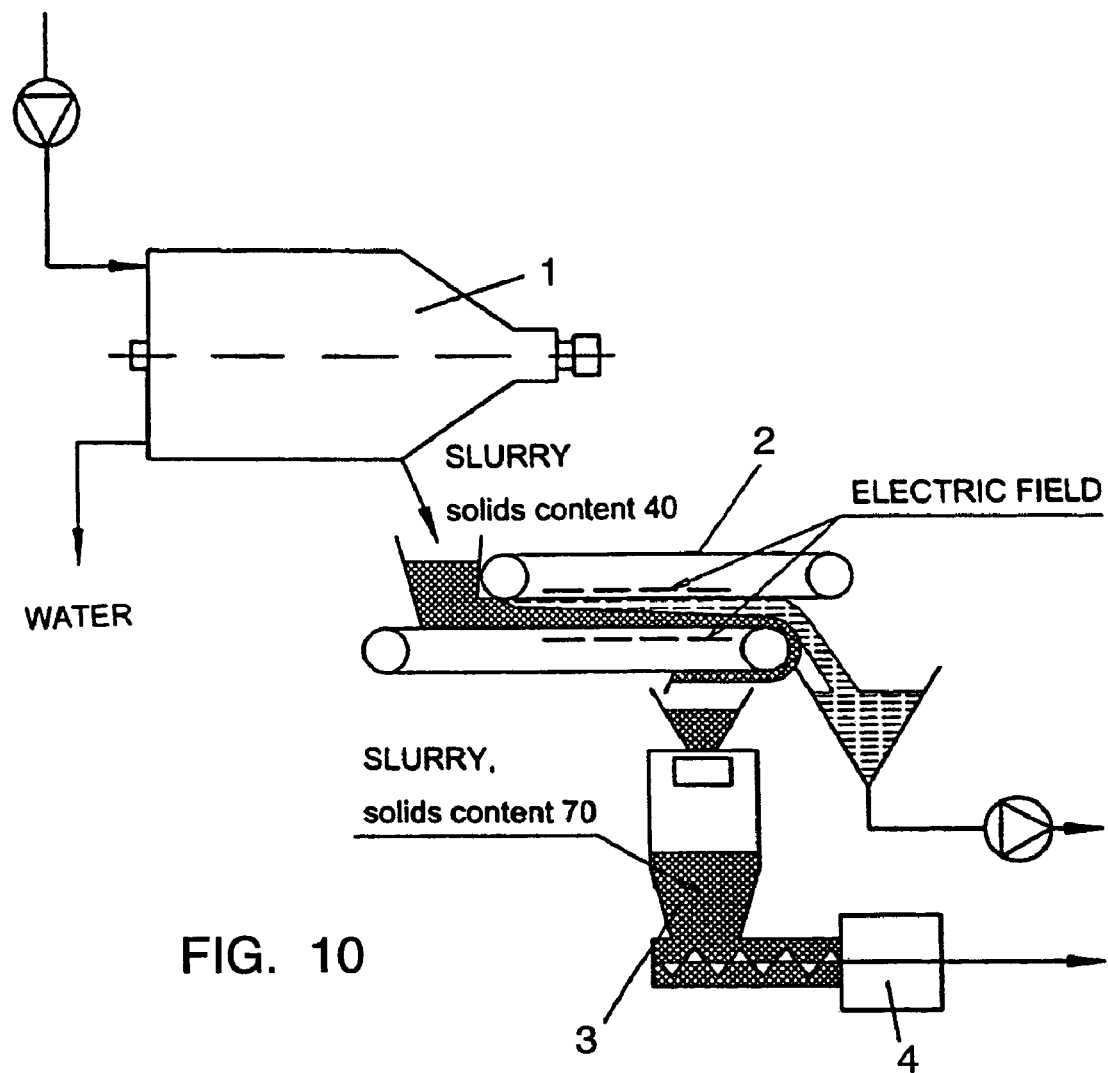
FIG. 10 shows the process flowchart of the first unit of the equipment according to the invention.

FIG. 10 shows a device for increasing the dry content of kaolin slurry to an area that is advantageous for forming kaolin agglomerates.

Reference number 1 refers to kaolin (natural kaolin) water slurry obtained from a factory, its dry content generally being less than 10% by weight. The slurry is centrifuged, whereby the solids content can be increased to about 40% by weight. Reference number 2 refers to a water separator based on the use of an electric field. Typically, the field voltage is about 1-20 V, preferably about 4-10 V, more preferably about 6 V. In the device, the solids content is increased from 40% by weight to 70% by weight. Reference number 3 represents a rotor diffuser, which is used for the elutriation of kaolin cakes that have a high dry content. The thus obtained mass is pumped forward by means of a high-pressure pump at a pressure of 200-500 bar and into the drying device shown in FIG. 4. A pre-feed pump (which has no reference number of its own) and the high-pressure pump are capable of treating slurry with a rigidity of 1000 cP.

The assembly shown in FIG. 10 is continuous. It replaces, for example, the pressure filtration process that is commonly used.

Figure 11:
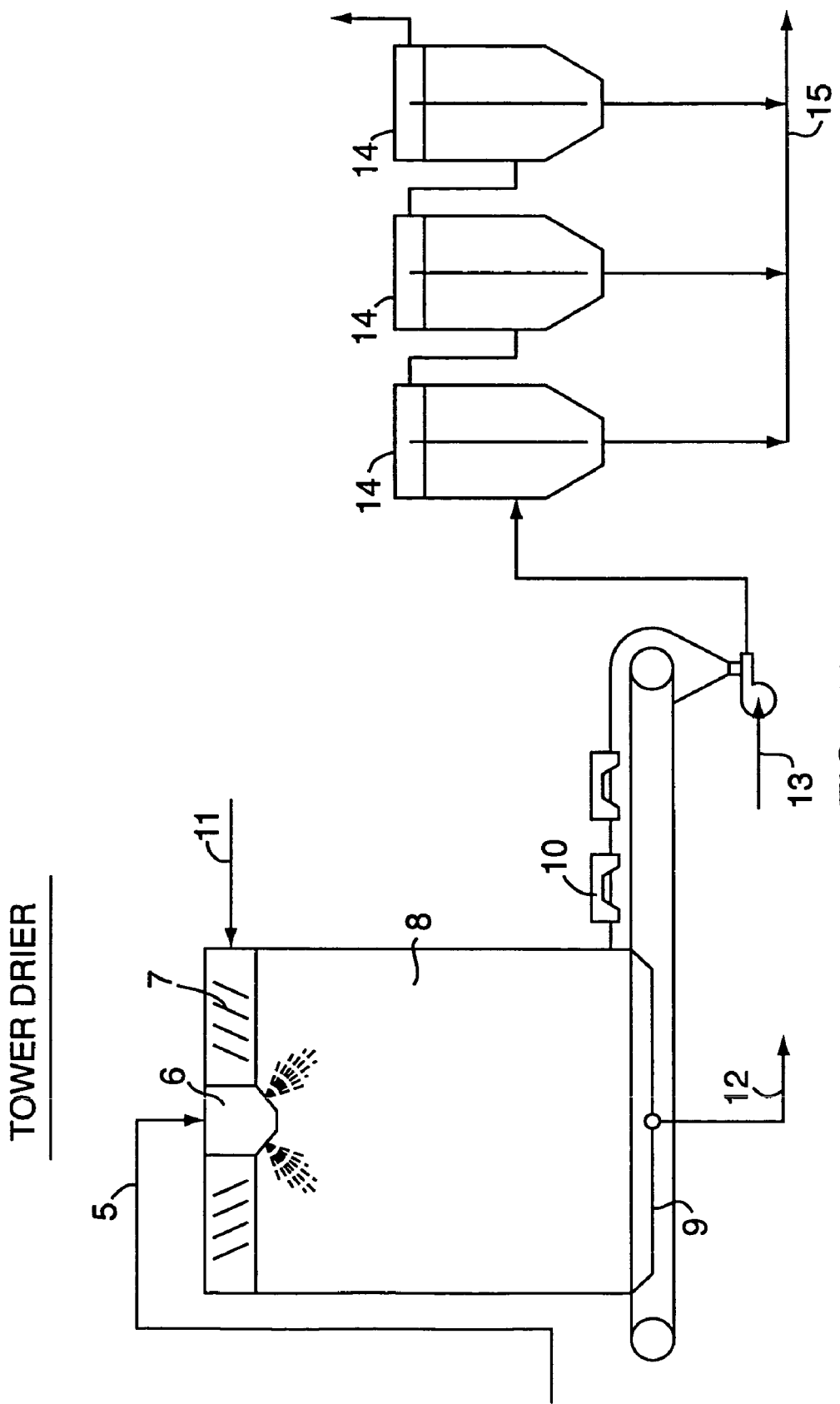
FIG. 11 shows the process flowchart of the drier unit used in the invention.

The tower drier according to FIG. 11 prepares the kaolin agglomerate particles. The equipment comprises a cylindrical container space, into which kaolin slurry is fed 5 from the hoisting device of solid matter. The slurry is fed under pressure into nozzles 6, from which the slurry is sprayed into the container space, where the drops dry and form agglomerates. Feeding the high-pressure slurry is carried out in a drop size of 2-50 micrometres and at a solids content of 70%, whereby the solid matter is locked into agglomerates in a few milliseconds. Drying air guides 7 are used for drying, through which guides air is conducted into the container space, fluid air 11 at 400° C. in particular. The water-carrying agglomerates fall onto a wire 9 and the fluid gas is separated 12 and conducted to a jet condenser. The temperature of the fluid gas is over 100° C. and it is taken forward to the jet condenser. The agglomerates are dried with radiating heat 10 and transferred by means of a fan 13 to ionic wind classifiers 14 and further through a transfer tube system 15 to intermediate storage silos.

Figure 12A:
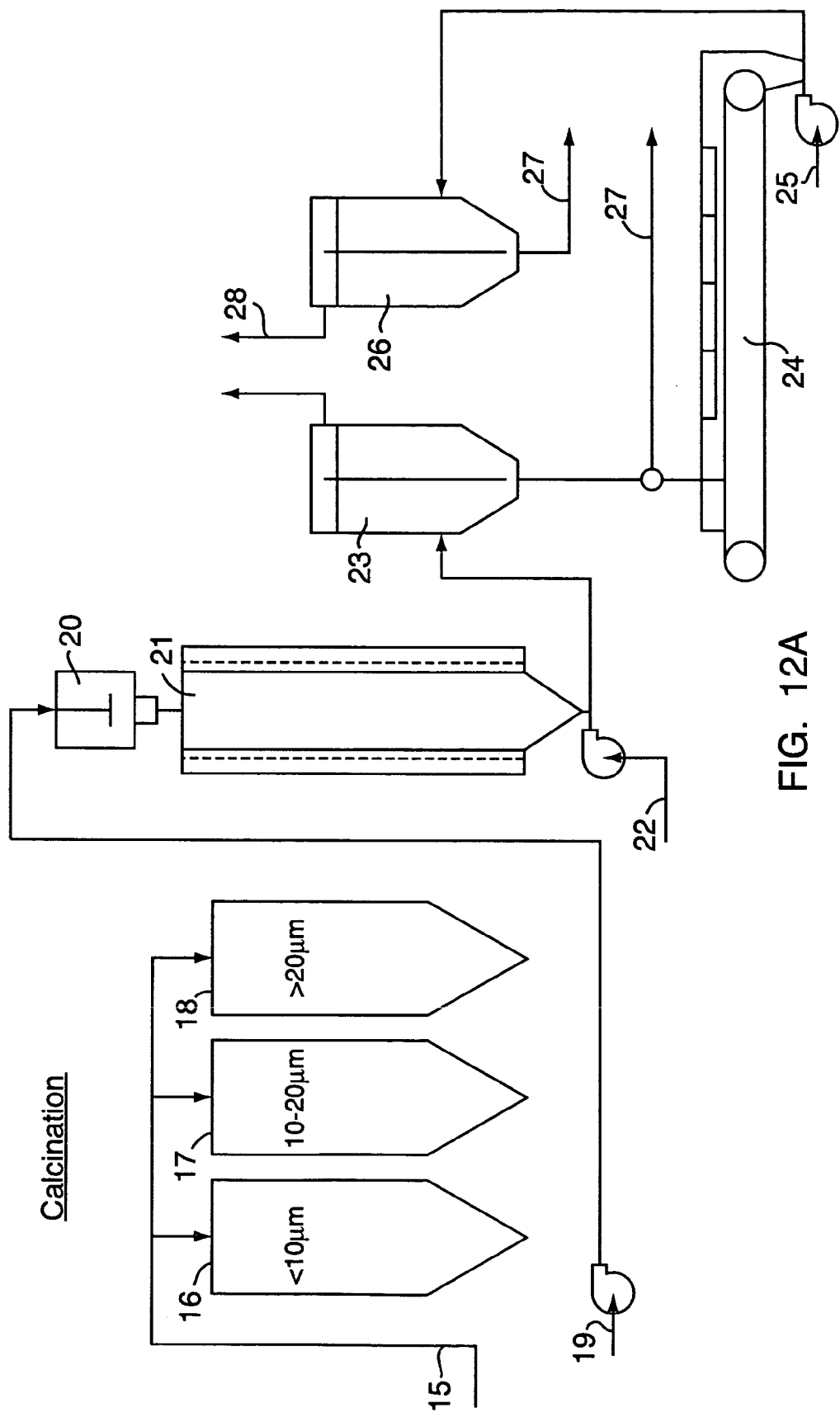
FIGS. 12a and 12b show the process flowcharts of the calcination units used in the invention.
Figure 12B:
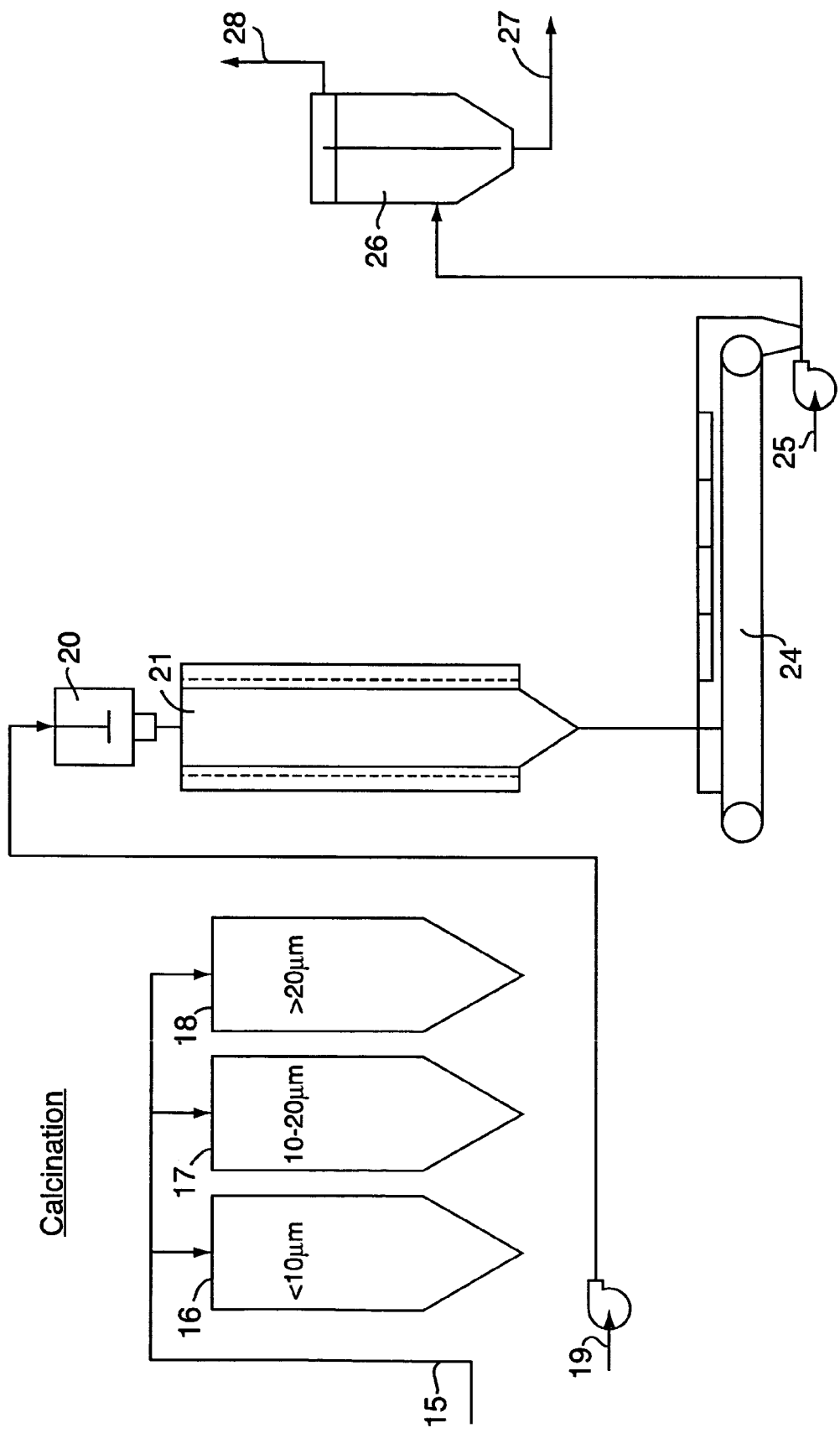

Calcination of kaolin agglomerates is carried out in the calcination equipment according to FIGS. 12a and 12b, respectively. First, the equipment has intermediate storages (silos) 16-18, wherein agglomerates of three particle sizes, for example, are stored separate from each other. Typically, in the first silo 16, agglomerates are stored, the average size of which is less than 10 micrometres. The size of agglomerates in the silo 17 is 10-20 micrometres, and in the intermediate storage 18, the size of agglomerates is over 20 micrometres.

The agglomerates are transferred from the intermediate storages 16, 17 and 18, respectively, by means of a fan 19, to the batcher 20 of a calcination furnace, wherein the agglomerates are also mixed. The agglomerates are calcinated into metakaolin in a radiation furnace 21. The calcinated agglomerates are cooled to 400° C. by a fan 22 and blown into an ionic wind classifier 23, from where they continue either to storage 27 or to an exothermic calcination furnace 24. The calcinated agglomerates are cooled to a temperature of about 400° C. by means of a fan 25, and transferred to storage after an ionic wind classifier 26, and the gas is blown to a tower drier 28 at a temperature of 400° C. The embodiment in FIG. 5b differs from the solution in FIG. 5a in that all the metakaolin obtained from the first calcination are recalcinated 24, whereby the ionic classifier 23 is omitted from the process.

The process described above includes considerable advantages:

1. Combined structure
   Agglomeration-calcination provides energy savings
   When a precise calcination temperature is obtained, the classification into different fractions improves the quality of the product
   The range of applications of the product grows
2. The amount of binding and sintering admixtures can be minimized
3. The degree of calcination between the surface and the inner part of the agglomerate can be made different
4. In the formation of the agglomerate, complementing the gas phase heating with radiation heating brings about considerable savings in energy.
5. When high solids content (70%) is used, the gas phase heating, the energy economy of which is less advantageous, is restricted to a minimum
6. Calcination to the metakaolin phase by means of the fluid radiation process makes the calcination accurate (the time 0.1-0.5 s)
7. Calcination to the exothermic crystal structure takes time (about 1 hour) and is carried out for metakaolin agglomerates in a grate furnace, for example. The metakaolin phase has removed the 'edges' from the agglomerates so that they are not sintered to each other.
8. The ionic wind classification treats the agglomerates gently and, for its part, saves the binder.
9. The ionic wind classification also saves energy compared with cyclones and other mechanical classifiers Products manufactured by the above-described process are suitable for various uses, which are dealt with in detail in the following:

Admixture of Concrete

The admixture of concrete and its use are already described in detail above. Let us mention that a wide size distribution of agglomerates is generated in the tower drier, of which agglomerates those over 20 microns are very well suited to admixtures of concrete. These agglomerates, which are in the same order as cement particles, settle among Portland cement particles, acting, among others, as pozzolans and deliverers of water at the phase of the autogenous reaction of cement, and as exact storage for the various additives of cement.

Larger metakaolin particles with a size of over 50 microns act as pozzolanic fillers and plasticizers of concrete.

Paper Filler

According to the invention, one purpose of paper filling is to make part of the calcinated kaolin stick to the fibres, but the majority of the agglomerates, the composition of which can either be metakaolin or calcinated kaolin that has undergone an exothermic transition phase, settles between the fibres, providing an even web with advantageous optical and mechanical properties of paper.

Paper Coating Material

Metakaolin or calcinated kaolin that has undergone the exothermic transition phase can also be used for paper coating.

EXAMPLES

The agglomerate product used in the examples was prepared by the process described in FI patent application 20012116. An MKA fraction was used in the tests, its agglomerates being 5-100 microns in diameter.

Example 1

The example examines the effect of MKA on the viscosity of binder paste. First, cement paste with different water-binder ratios without stone aggregate was prepared in the test, using general-purpose cement (Portland cement). The viscosity of the paste was measured by the Brookfield viscosimetre after a fixed time period from the mixing. The results are described in FIG. 1. After this, another mix was prepared, wherein ⅓ weight fraction of the cement was replaced with ⅙ weight fraction of MKA. The smaller weight fraction is a consequence of the lower density of MKA (3.15 kg/dm³ vs. 1.0 kg/dm³).

As the curve indicates, the viscosities of the cement paste blended with MKA are on a considerably lower level, or the dry content that corresponds to the same viscosity is higher for the paste blended with MKA. Formula (1) can be used to calculate that, at a point corresponding to the dry content of 40%, wherein the viscosity is 1120 mPas and which is still on an area that can be worked, x=0.59 is obtained, and the corresponding strength from the formula (8) is 42 MPa. The corresponding water-binder ratio is 0.48. When a paste blended with MKA is prepared, x=0.70, the corresponding strength being 78 MPa. This means that the early strength grows by 86%.

A stripping strength of 40 MPa is achieved already at a degree of hydration of α=0.30, i.e., stripping can take place on a considerably lower hydration level and, consequently, considerably quicker than before.

Example 2

The example examines the absorption of water into MKA. In the graph of the formula (9), the portion of the pore volume of the particles is used as the y-axis, the portion having been filled with water as a function of time t. 1.0 kg/dm³ is used as the density of the agglomerate. The estimated pore volume in that case is about 50%.

The graph shows that the space between MKA particles (63%) is filled after 5 minutes, 50% of the pore volume of the particles was filled in 9 minutes, and 90% in 17 minutes.

Example 3

The example demonstrates an advantage provided by the invention to industrially produced pre-cast floor slabs of buildings, i.e., so-called hollow-core slabs, which are manufactured by extruder machines. Considerable factors in industrial production are the casting rate, the early strength, the measurement accuracy of the slab and the soil creep, i.e., subsequent changes on the compression side.

In the case of the example, the highest casting rates of the machines, about 4 m/min, are reached when the amount of slurry to be cast is

|  | Mass, kg | Density, kg/dm³ | Volume, dm³ | % by volume |
| --- | --- | --- | --- | --- |
| Cement | 330 | 3.15 | 105 | 39 |
| Water | 165 | 1.00 | 165 | 61 |

(Water-cement ratio = 0.5)

The effect of the gel-space ratio on the strength is examined in accordance with the formula (1)

$$X = \frac{2.06\, v_c c\alpha}{v_c c\alpha + w}$$

wherein the constant describing the change in the cement volume during hydration=2.06

$v_c$=specific volume of cement, dm³/kg=0.32 c=weight of cement, kg=330

α=degree of hydration=0.6

(The value has been selected in accordance with the present practice, corresponding to a situation, where stripping ccan take place)

w=water volume, dm³=165

Using the above parameters, a value of 0.57 is obtained for the ratio, corresponding to the strength of 40 MPa on the graph according to FIG. (3).

When the final strength has been reached, the degree of hydration is 0.8. The value of the ratio is then 0.7, the corresponding strength being 75 MPa.

When MKA admixture is used to replace part of the binder, the corresponding calculation is as follows:

|  | Mass, kg | Density, kg/dm³ | Volume, dm³ | % by volume |
| --- | --- | --- | --- | --- |
| Cement | 200 | 3.15 | 63 | Solid matter |
| MKA | 65 | 1.0 | 65 | Total 49% |
| Water | 133 | 1.00 | 133 | 51% |

(Water-binder ratio=0.5)

When taking into account that, in the example, the amount of water absorbed by MKA is half of its weight, a corresponding examination of the gel-space ratio indicates $$X = \frac{2.06\, v_c c\alpha + V_{MKA}}{v_c c\alpha + V_{MCA} + w_1},$$

wherein $v_c$=specific volume of cement, dm³/kg=0.32 c=weight of cement, kg=200

α=degree of hydration, %=0.4

(The value α is selected, which provides the same level of strength as the conventional cement mix)

$V_{MKA}$=volume of metakaolin agglomerates, dm$^3$=65

$w_1$=water volume, dm$^3$=147−32=115

(Total water volume−the water volume absorbed by the agglomerates)

In that case, the ratio obtains a value of 0.57, which corresponds to the strength of 41 MPa, i.e., the same strength was achieved quicker at a lower degree of hydration (0.4 vs. 0.6 for unmixed cement). If we examine the development of strength corresponding to the same degree of hydration (0.6) as that of unmixed cement, a value of 0.66 is obtained for the gel ratio, corresponding to the strength of 63 MPa. Accordingly, the strength corresponding to the same degree of hydration has grown by 54%, when part of the cement is replaced with MKA. The corresponding calculation for the final strength (α=0.8) indicates that a value of 0.74 is obtained for the gel ratio, corresponding to the strength of 90 MPa, i.e., the growth of the final strength thus obtained is 20%. This examination does not try to optimise the properties of the product but it indicates that the economic significance of the invention in the manufacture of the product is considerable.

REFERENCES

1. Verbeck, G. J., Helmuth, R. H. Structures and physical properties of cement paste, Proceedings of the 5$^{th}$ international symposium on the chemistry of cement, Tokyo, 1968, vol III, pp. 7-12
2. Neville, A. M., Properties of concrete, Pitman Publishing Limited, London, 1977, pp. 276-285

The invention claimed is:

1. A mix containing a hydraulically hardening binder and a pozzolanically reacting admixture, the pozzolanically reacting admixture comprising spherical, porous calcined agglomerates, said agglomerates being formed prior to calcination, said calcined agglomerates at least partly consisting of metakaolin particles; and whereby the size of individual agglomerates is 2-200 microns.

2. The mix according to claim 1, wherein the mix is containing at least 50% by weight of the hydraulically hardening binder.

3. The mix according to claim 2, wherein the mix is containing about 35% by weight of the pozzolanically reacting metakaolin agglomerate at the most.

4. The mix according to claim 1, wherein the pores of the admixture are filled with gas before processing the mix, whereby the said gas is carbon dioxide or air or a mixture thereof.

5. The mix according to claim 1, wherein the size of the porous agglomerate is 5-200 microns.

6. The mix according to claim 1, wherein the average size d50) of the porous agglomerate is the same or essentially the same as the average size d50) of the particles of the cement-containing binder used in the mix.

7. The mix according to claim 1, wherein the size and the number of the agglomerates are such that, in the mix, their mutual distance from one another (the spacing factor) is less than 200 microns, on the average, whereby the porous agglomerates, which were emptied of water in the hardened mix, are capable of improving its frost resistance.

8. The mix according to claim 1, wherein on the surface of the agglomerate, there is calcium oxide which, when reacting with water, changes into calcium hydroxide and starts to react pozzolanically with the metakaolin.

9. The mix according to claim 1, wherein the mix can be hardened to form a binder mass, which has a porous matrix formed by strong agglomerates, in which matrix the gap between the pores is 5-500 microns.

10. The mix according to claim 9, wherein the mix can be hardened to form a hardened binder mass, the 28 d compressive strength of which is 60-160 Mpa, preferably 80-120 Mpa.

11. The mix according to claim 9, wherein the mix can be hardened to form a hardened binder mass, the compressive strength of which is obtained from the graph in FIG. 3 according to the following formula $$X = \frac{2.06 \, v_c c\alpha + V_{MKA}}{v_c c\alpha + V_{MKA} + W_1},$$

wherein

X=gel-space ratio $v_c$=specific volume of cement, dm$^3$/kg c=weight of cement, kg α=degree of hydration, %

$V_{MKA}$=volume of metakaolin agglomerates, dm$^3$ $W_1$=volume of water, dm$^3$=total water volume−the water volume absorbed by agglomerates.

12. A process for preparing a hydraulically hardened binder mass, comprising:

forming a paste-like composition from a hydraulically hardening binder, a pozzolanically reacting admixture and water, which, when so desired, contains stone aggregate or similar filler;

using spherical, porous agglomerates, which at least partially consist of metakaolin particles, as the pozzolanically reacting admixture;

processing the paste-like composition;

allowing the worked composition to harden to form the binder mass;

wherein the spherical, porous agglomerates having an individual agglomerate size of 2-200 microns are used as the pozzolanically reacting admixture, whereby the density of the surface part of individual agglomerates is lower than that of the inner part and the pore structure of individual agglomerates in the surface part and the inner part is essentially the same; and the difference between the amount of water required by the workability of the paste formed from the binder and the admixture and the smaller amount of water required by the hydration reactions is stored in a reversible way, after processing the binder paste, in the pore structure of the said spherical, porous agglomerates and returned in subsequent hardening phases of the binder paste.

13. A process according to claim 12, wherein a binder mass is prepared, the portion of the spherical, porous agglomerates of the total amount of the binder and the admixture being about 5-35% by weight.

14. A process according to claim 12, wherein agglomerates are used, the size of which is 5-200 microns and the average size d50) of which is the same or essentially the same as the average size d50) of the particles of the cement-containing binder used in the mix.

15. A process according to claim 12, wherein the filling of the pores of the porous agglomerates used in the mix is adjusted so that it begins within 1-60 minutes from the time, when the components of the binder mass have been mixed together.

16. A process according to claim 12, wherein the pore structure of the porous agglomerates used in the mix is filled with water within 20 minutes from the time the components of the binder mass have been mixed together, preferably so that 90% of the pore volume is filled within 10 minutes from the termination of mixing.

17. A process according to claim 12, wherein the filling speed of the porous agglomerates used in the mix is adjusted, preferably increased using mechanical methods that are commonly used in connection with dampproofing cement, such as vibration or pressurization so that 90% of the pore volume is already filled within 20-60 seconds.

18. The mix according to claim 1, wherein the mix can be hardened to form a binder mass, which has a porous matrix formed by strong agglomerates, in which matrix the gap between the pores is 20-100 microns.

* * * * *